Oct. 19, 1937.    G. J. DASHEFSKY    2,095,970
METHOD OF AND APPARATUS FOR ELIMINATING TORSIONAL
VIBRATIONS FROM POWER INSTALLATIONS
Filed March 23, 1927    2 Sheets-Sheet 1
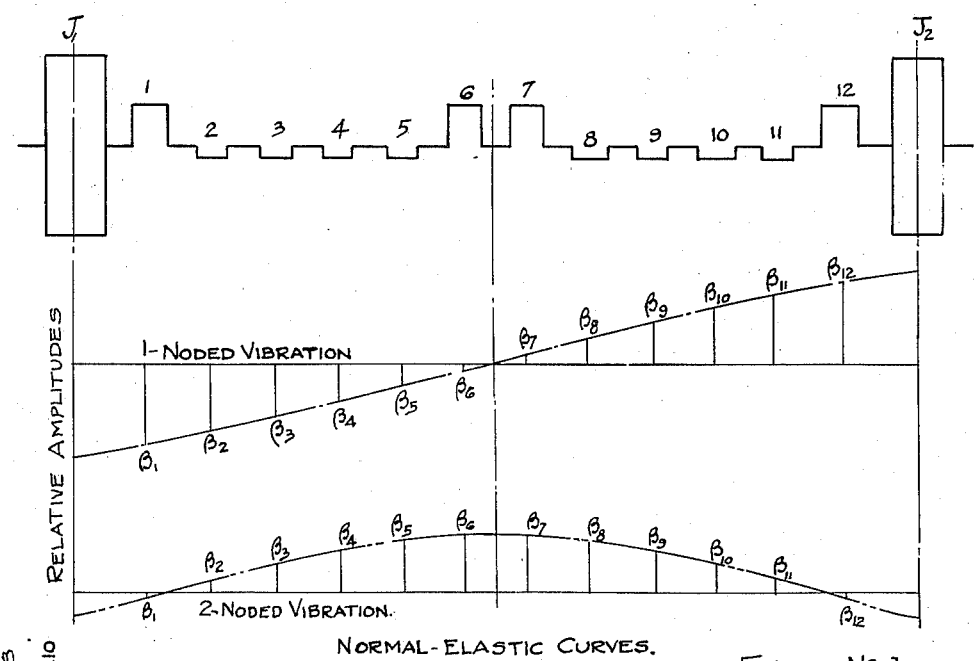
NORMAL-ELASTIC CURVES.    FIGURE No. 1.
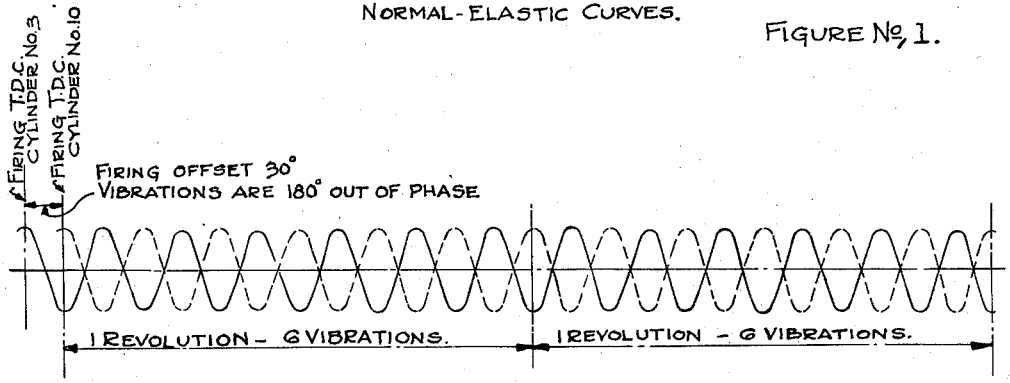
CYLINDERS AT POINTS WHICH
VIBRATE WITH EQUAL AMPLITUDE
IN THE SAME DIRECTION.
FIGURE No. 2.
George Joseph Dashefsky
INVENTOR
BY
Robert A. Lavender
ATTORNEY

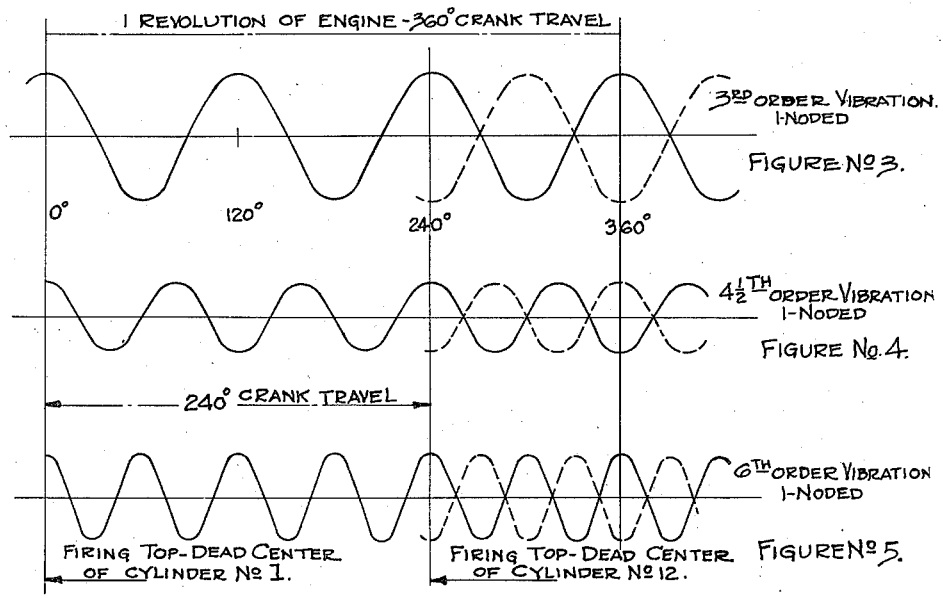
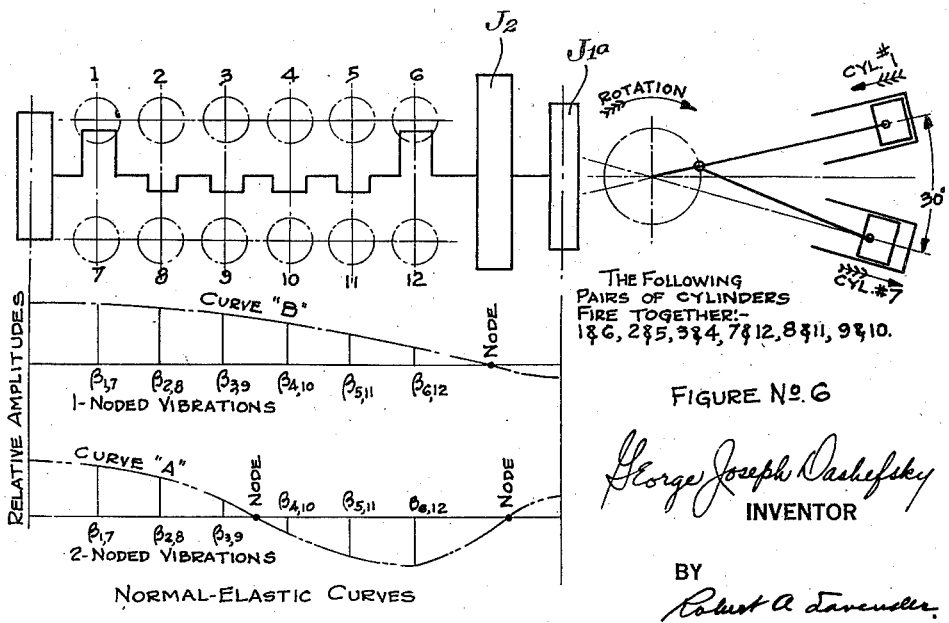

Patented Oct. 19, 1937

2,095,970

UNITED STATES PATENT OFFICE 2,095,970

METHOD OF AND APPARATUS FOR ELIMINATING TORSIONAL VIBRATIONS FROM POWER INSTALLATIONS

George Joseph Dashefsky, Brooklyn, N. Y.

Application March 23, 1927, Serial No. 177,746

15 Claims. (Cl. 74—604)

(Granted under the act of March 3, 1883, as amended April 30, 1928; 370 O. G. 757)

This invention relates to improved methods of and apparatus for eliminating torsional vibrations from power plant installations which when not eliminated cause serious permanent distortion of the crank-shaft or other vital part or parts, or cause the fracture-failure thereof, or require that such part or parts be made very ponderous and thus entailing grave bearing, weight and cost problems It is common knowledge that, for instance, a note sounded by a violin of a definite recurring frequency and magnitude will cause the fracture of a sound drinking glass even at a distance from such violin by the cumulative or multiplying magnitude of the resulting recurring viibrations which were of initial insignificant magnitude.

Heretofore, in power installations the power impulses, for instance in reciprocating engines of high speed when the problem is most critical, the power impulses recur very rapidly and may be of substantially equal magnitude, a similar critical condition prevails and requires the effected part or parts to be made very ponderous to thereby reduce this tendency toward their permanent distortion or failure, but such vibrations remain inherent in such structures and tend to crystallize the metal forming such part or parts and which crystallization greatly shortens the effective life of such part or parts, besides entailing grave bearing, weight, cost and replacement problems.

The primary object of this invention is to provide methods of and apparatus for eliminating torsional vibrations from power installations and overcoming at their source the aforesaid and other inherent grave conditions.

To attain these and other objects, and in accordance with the general features of this unitary and related invention, my improved method contemplates a power unit created by a plurality of separate recurring impulses positioned relative to each other and to the power transmission; that said impulses recur in pairs and at non-synchronous periods preferably of substantially equal magnitude and neutralize the otherwise recurrent vibration producing cumulative harmonic component of their transmitting effort upon said transmission.

Since all vibrations have definite and characteristic nodal points, I have also discovered that such nodal points should be located, for efficient results in vibration elimination, in definite relation to each one of said pair of recurring power impulses, and therefore my said method contemplates such relation, My said method further contemplates the connection of each of said power impulses to the power transmission at points which would tend to vibrate with substantially equal amplitude but for the fact of said impulses being non-synchronous and counter-phase such tendency to vibration.

My said method further contemplates a power transmission having a symmetric distribution of its effective inertias and elasticities so as to give a symmetric normal-elastic curve thereover, the imparting to said transmission of power impulses in co-acting pairs of substantially equivalent magnitude symmetrically disposed on said transmission, with each impulse of said pair acting in such phase relation as to substantially neutralize torsional vibration.

My said method further contemplates a power installation having natural periods of mass-elastic vibration with one or more nodes, a power transmission, a group of power impulses producing motion of said transmission having one or more harmful harmonic components which are eliminated by a second group of power impulses also producing motion of said transmission with each said impulse of said second group forming a co-acting pair with an impulse of said first group and with the several impulses of each of said pair non-synchronous and neutralizing said harmful harmonic components; and further contemplates the symmetrical relation of each one of each said pair of impulses to one of said nodes; and further contemplates, with either or all the aforesaid steps of my method, that the several impulses forming each said pair counterphase their several tendencies to produce harmful harmonic components and/or said counterphasing being by timing each impulse of said pair to occur and recur as much as one hundred and eighty degrees out of phase with each other with respect to said natural period of mass-elastic vibration.

To demonstrate the practical utility of my said method a related, interdependent, improved, novel apparatus embodying my invention, and which may be used advantageously and economically in practicing my said improved method as a unitary invention, is provided to also serve as an example to those skilled in the art, of the facility with which, after becoming familiar with my invention, the many forms and kinds of existing apparatus, with or without substantial modification, may be employed in the efficient practice of my said method in like or kindred arts.

This invention has for an object to so arrange the several impulse members of a power unit, as to cause automatic neutralization of the harmonic torques which stimulate torsional vibrations and result in critical torsional synchronous speeds.

This application embodies many of the principles involved in my application for patent for Methods of eliminating torsional vibrations from power installations, Serial Number 138,322 filed September 28, 1926.

The above application described various methods for neutralizing torsional vibration by counterphasing the cylinders, i. e. causing the cylinders to co-act in pairs in such a manner as to neutralize the stimulating forces. The counterphasing consisted essentially in firing the cylinders in pairs, each cylinder of a pair being operatively connected to the shaft at respective points, on the normal elastic curve, which tended to torsionally vibrate with equal but opposite amplitudes.

This application has for a purpose, in an apparatus sense, to provide method of and means for neutralizing the harmonic torques which result in synchronous torsional vibrations.

These and other objects of my invention, in its method as well as apparatus aspects, will be more apparent from the following detailed description and the accompanying drawings illustrating the preferred embodiment of my invention in an improved apparatus, of the many different forms and characters of apparatus each of which may be employed in the practice of my improved method.

The principles involved have been quite comprehensively described in my application of September 28, 1926. However, the essential points will be briefly discussed here for easy reference.

Every mass-elastic system is capable of torsionally vibrating in its natural periods with one or more nodes. For each number of nodes there is a definite corresponding frequency of torsional vibration. The shafts of reciprocating engines together with their flywheels and attached machinery, constitute such a system.

In the instance of reciprocating engines, particularly combustion engines, the turning efforts are quite irregular. This irregular, but cyclic, torque may be resolved into a series of harmonic torques, which together with a mean constant torque, are equivalent to the total engine torque. The harmonic components have frequencies which are equal to and integral multiples of the frequency of recurrence of the engine cycle. Thus there is the first harmonic or fundamental which has the same frequency as the engine cycle; the second harmonic with a frequency twice that of the engine cycle, a third harmonic with a frequency thrice that of the engine cycle, etc. Each of these harmonic torques is tending to stimulate the shafting into torsional vibration. When the frequency of any harmonic component coincides with one of the natural frequencies of vibration of the shaft, a so-called synchronous or critical speed of torsional vibration results. These speeds may give rise to very large amplitudes and also to excessive stresses which being usually most harmful, are the ones most advantageous to eliminate.

The order of a vibration is defined as the number of vibration cycles occurring per revolution of the engine. Thus in the four cycle engine, where there are 2 revolutions per cycle, the fundamental, second harmonic, third harmonic, fourth harmonic, etc. are known respectively, as the ½, 1st, 1½, 2nd orders, etc. In the 2 cycle engine there is but one revolution per cycle and the order of vibration is obviously the same as the number of the harmonic.

Orders of vibration which are equal to or an integral multiple of the number of engine cycles per revolution are known as major orders. Others are known as minor orders.

In considering the stimulation of synchronous torsional vibrations, matters are simplified by considering the action of each cylinder separately and later combining the effect of the several cylinders. For the purpose of illustration we are considering engines of the internal combustion type with a number of equal cylinders, (Diesel oil engine or the usual gasolene engine.)

Figure 1 is a diagrammatic view of a crankshaft at its upper edge, embodying my invention; the middle portion diagrammatically representing its relative amplitudes of its vibration, under stresses, of a one noded vibration; and the lower portion thereof representing the relative amplitudes of the vibration of said crank-shaft, under stresses, of a two noded vibration;

Figure 2 is an enlarged diagrammatic view of the normal vibrations of said shaft under the influence of two relative power impulses, for instance cylinders number 3 and 10 when, connected to said shaft at points which normally would vibrate with equal amplitudes in the same direction with said impulses being about 30 degrees out of phase with each other, for instance in power cylinders the firing being about 30 degrees offset, and said impulses or cylinder firing, being about 180 degrees out of phase, relative to said normal shaft vibrations, illustrating how said several vibrations counter-phase or neutralize each other.

Figures 3, 4, and 5 are related diagrammatic views of the power transmission or crank-shaft, different order vibrations at the different degrees of rotation thereof, initiated, for instance with power impulse, or cylinder, number one, and the counter-phasing effect on said different order vibrations produced by the imparting thereto of a subsequent power impulse, or cylinder fired, for instance at 240 degrees of such rotation; and Figure 6 is a diagrammatic view, the upper portion of which represents at the left a plan view of the crank-shaft with its, for instance, six cranks and at the right how the pairs of power impulses are offset relative to each unit of each pair; the middle and lower portions thereof indicating the relative amplitudes respectively of a one and a two noded vibration thereof.

Reference is made to Figure 1 of the drawings included in the specification, which diagrammatically shows a typical electric-generator unit, including a 12 cylinder engine. The curve of relative amplitudes of torsional synchronous vibration for each of the one and two nodes are shown associated in said figure. These curves are termed the normal-elastic curves.

For equivalent cylinders the importance in vibration depends upon the relative amplitude of vibration $\beta$, at the point where, as well as when, each such cylinder imparts its impulses. The effective inertias and elasticities of the above unit have been so co-related that the resulting normal-elastic curves are, in the instance shown in Figure 1, and in a sense in Figure 6, symmetric over the crankshaft. Thus the cylinders are in pairs, each of a pair being connected to a crank vibrating with equal absolute amplitude. The following are grouped into such equal-amplitude pairs for results which I have found satisfactory in the twelve cylinder engine typical of Figure 1: cylinders numbered 1 and 12, 2 and 11, 3 and 10, 4 and 9, 5 and 8, and 6 and 7. Since each cylinder of a pair vibrates with equal amplitude, β, each is of equal importance in stimulating torsional vibration.

In order to eliminate one or more orders of torsional impulses it is also necessary that the vibrations of the individual cylinders of a co-acting pair shall have such relative phase and be imparted to the crank shaft at such point or points that the resultant torsional vibration heretofore set up in said shaft is neutralized to zero.

For the 6th order vibration, there are:

$6 \times 360 = 2160$ degrees of torsional vibration cycle. These 2160 degrees occur over 360 degrees of crank travel. Thus 1 degree of crank travel is equivalent to 6 degrees of 6th order of torsional vibration cycle. To cause a pair of cylinders to counterphase their normally occasioned vibrations, it is necessary that their power impulses be imparted at time intervals out of phase with each other, for instance of opposite phase. Thus if the two cylinders of a co-acting pair, cylinders numbers 3 and 10 in this example, be arranged to fire 30 degrees (crank travel) apart, the torsional vibrations otherwise set up by the power impulse of the respective cylinders will be 180 degrees (vibration cycle) out of phase and are thus neutralized. This condition is illustrated in Figure 2. It should be noted that each half of the engine of Figure 1 is the equivalent of a 6 cylinder—4 cycle engine. Thus if one pair of co-acting cylinders fire 30 degrees of crank travel apart, all co-acting pairs will necessarily fire in the same relation and the 6th order of torsional vibration will be eliminated. It should be noted that the above applies to the 6th order 2 noded torsional vibration where the amplitudes of torsional vibration for the respective cranks for the individual cylinders of a pair are of the same sign.

For the one noded torsional vibrations, the respective cranks for the individual cylinders of a pair vibrate with equal but opposite amplitudes. By virtue of this the vibrations differ in phase by 180 degrees (vibration cycle).

Now any change in the firing relation is in addition to this initial 180 degrees (vibration cycle) phase difference. Thus it is apparent that 30 degrees (crank travel) difference in the firing of a co-acting pair for one noded vibrations will result in building up the torsional vibration, rather than neutralizing it as was the case for the two noded torsional vibrations. To neutralize the one node torsional vibration the cylinders of a co-acting pair should fire 60 degrees (crank travel) apart, which gives the phase difference for the cylinders as 180 degrees+(6×60 degrees) =540 degrees of torsional vibration, which will cause the second impulse of such pair to be imparted to the shaft at a phase difference of 180 degrees of torsional vibration relative to the phase of the preceding impulse of such pair (vibration cycle).

The above indicates how it is possible to neutralize a torsional vibration by properly offsetting the firing of the co-acting cylinders of the several pairs.

In a similar manner, a pair of cylinders connected to cranks torsionally vibrating with equal amplitude of the same direction, and offset in firing by 40 degrees of crank rotation, will cause the neutralization of the 4½ order of torsional vibration. This follows from the fact that the pair of impulses and their resulting torsional vibrations differ in phase by 40 degrees of crank rotation× 4½=180 degrees of torsional vibration cycle.

In general, for co-acting pairs of cylinders, connected to cranks torsionally vibrating with equal amplitudes, the following equations may be written as expressing the offset in firing required to neutralize given orders of vibration.

Let:

$\theta$=number of degrees of crank travel elapsing between the firing top-dead centers of the cylinders of a co-acting pair.

$M$=order of torsional vibration desired to be neutralized.

$N$=any integer equivalent to the number of vibration cycles required in a given design to intervene between the first and second impulses of each coacting pair of impulses.

$\phi$=the number of degrees of torsional vibration cycle of the required phase difference between the two torsional vibrations normally respectively stimulated by each of the pair of co-acting cylinders.

Consider first a pair of cylinders connected to the crankshaft at points which tend to vibrate with equal but opposite amplitudes. Then, in order to neutralize the Mth order of vibration:

$$\phi = 180° + M \times \theta° = 360° \times N + 180° \quad (1)$$

$$\theta = \frac{360° \times N}{M} \quad (2)$$

To neutralize the Mth order of vibration by counterphasing cylinders connected to the crankshaft at points which tend to vibrate with equal amplitudes of the same direction:

$$\phi = M \times \theta° = 360° \times N + 180° \quad (3)$$

$$\theta = \frac{360° N}{M} + \frac{180°}{M} \quad (4)$$

The values of $\theta$ as expressed in Equations (2) and (4) allow the neutralization of any order of vibration. Thus when in the design of an installation it is desired to eliminate the 5½ order of vibration, whose normal elastic curve is similar to the two noded curve shown in Figure 1, it is required to find by what angle, ($\theta$), the firing of the two halves of the engine shall be offset.

$$\theta_{5\frac{1}{2}} = \frac{360 \times 1}{5.5} + \frac{180}{5.5} = 98.2° \text{ or}$$

$$\theta_{5\frac{1}{2}} = \frac{360 \times 2}{5.5} + \frac{180}{5.5} = 163.6°, \text{ etc.}$$

Thus there are sets of values for $\theta_{5\frac{1}{2}}$ which satisfy the conditions required for neutralization of the 5½ order of torsional vibration.

To fix notions, consider that it is required to neutralize the 3rd order of torsional vibration for the one-noded curve of Figure 1. The values of $\theta$ which satisfy the condition are found by substituting in Equation 2 as shown below:

$$\theta_3 = \frac{360° \times 1}{3} = 120°, \text{ or}$$

$$\theta_3 = \frac{360° \times 2}{3} = 240°, \text{ etc.}$$

These are two of the values of $\theta_3$ which will result in neutralization of the 3rd order of torsional vibration.

For certain values of $\theta$ while some torsional vibrations are being neutralized, it may happen that others are simultaneously built up. On the other hand, a proper choice of the value of $\theta$ may simultaneously neutralize several orders of torsional vibration.

Consider the engine of Figure 1, arranged so that the two halves (each a conventional 6-cylinder engine) are offset so that cylinder No. 12 fires 240° of crank travel later than cylinder No. 1. The value of $\theta$ in Equation (1) is thus 240°. The several co-acting pairs fire with this angular difference, and the same law of neutralization applies to every pair. Consider only the one-noded torsional vibration.

From Equation (1)

$$\phi = 180° + M \times \theta°$$

Substituting the value of $\theta$ in the above equation:

$$\phi = 180° + 240°M \qquad (6)$$

In a 12-cylinder-4-cycle engine similar to the one under discussion, orders of torsional vibration which may prove troublesome are the 3rd, 4½th, 6th, orders.

Substituting these values for M in the Equation (5) above:

For 3rd order, $$\phi = 180° + 3 \times 240° = 720° + 180°$$

For 4½th order, $$\phi = 180° + 4½ \times 240° = 1080° + 180°$$

For 6th order, $$\phi = 180° + 6 \times 240° = 1440° + 180°$$

It is apparent that each of the above torsional vibrations is neutralized, since $\phi = 360° \times N + 180°$.

The above cases are graphically shown in Figures 3, 4, and 5.

Other torsional vibrations of the one-noded mode may build up but in many instances the above mentioned are the only ones of considerable importance.

Taking the installation of Figure 1 for another illustration of my method of neutralizing torsional vibrations, consider again the one-noded torsional vibrations. Let the firing of the individual cylinders of a pair be offset by ($\theta = 720°$).

$$\phi = 180° + M\theta \qquad \text{Equation (1)}$$

Substituting the value of $\theta$, $$\phi = 180° + 720°M$$

It is obvious from the above that for every value of M, $\phi$ reduces to $360° \times N + 180°$ whereby every order of torsional vibration for the one-noded mode is most efficiently neutralized.

The method of counterphase neutralization described in my application of September 28, 1926, is an application of the principles laid down in this application, where $\theta$ is given the value of 720° for the 4 cycle engine and 360° for the 2 cycle engine.

It has thus been shown how it is possible by my invention to neutralize torsional vibrations by counterphasing the cylinders for the respective cases where their respective cranks torsionally vibrate with equal amplitudes in the same direction, or with equal amplitudes in opposite directions.

In every case the method depends upon having the cylinders of a pair connected to the shaft at points which torsionally tend to vibrate with equal amplitude. This characteristic of an installation design for the purpose of eliminating torsional vibration is considered an important part of my invention.

Figure 6 illustrates the manner in which this invention may be applied for the purpose of simultaneous neutralization of torsional vibrations of two different nodes. The installation shown is that of an engine of the V type, where two cylinders act together on the same crank. Assume the engine operates on the two-stroke cycle.

Assume that the effective masses and elasticities of the unit have been so distributed in the design and construction of the engine as to give a one-noded normal-elastic curve as shown by curve "B" and a two-noded elastic curve which is substantially symmetric over the crankshaft as shown on curve "A". Consider this hypothetical installation to have a 6th order one-noded vibration which is undesirable, also several orders of two-noded vibrations which are troublesome. Let the cylinders 1 and 7, 2 and 8, 3 and 9, etc. be offset in firing by 30° of crank rotation relative to the cylinders of each co-acting pair, which will give the torsional vibration set up in the crank shaft by the individual cylinders of the above pairs a phase difference of 180°, vibration cycle, for the 6th order one-noded torsional vibration. Let the cylinders of each pair 1 and 6, 2 and 5, and 3 and 4 fire together, and the pairs 7 and 12, 8 and 11, and 9 and 10 fire together. The above pairs will neutralize all two-noded torsional vibrations of the crank shaft since they are arranged in a firing relation of 360° of crank travel, which similates the conditions described previously in my application of September 28, 1926.

The example given above illustrates how it is possible simultaneously to counterphase the torsional vibrations normally set up in the crank shaft by the cylinders connected to the crank shaft at a point or points which tend to vibrate with equal amplitudes of opposite phase and also of the same phase.

It will be appreciated by those skilled in this art that there are many modes of torsional vibrations possible in any given transmission; that the most efficient employment of my invention may be attained in transmission designed therefor; that such design should provide mechanism of such characteristics inherent in the provided mechanism, its materials, proportions, relative masses and dispositions, operating speed range and other factors, that the modes of torsional vibration other than those adapted to be substantially eliminated by my invention are either not present under conditions within said factors, or are not liable, under conditions within said factors, to be excited to any magnitude likely to be harmful, or if any of the same be present that such design inherently permits the same to be normally evidenced in a frequency so high that only orders of negligible magnitude fall within the normal operating range and therefore have no tendency to become harmful; and that the designer will then further provide such design with applicant's invention whereupon the mechanism constructed in accordance with my invention will normally be substantially free from harmful torsional vibrations.

When torsional vibrations occur in such designed mechanism of an order, mode and/or magnitude liable to be harmful, it is evident that the mechanism is being operated at an abnormal speed and that such speed should be brought to any one of the usual many speeds within the operating speed range factor of said design, because said factor is usually the only factor that is variable.

The foregoing keeps the involved vibration frequencies so high that only orders of vibration of negligible magnitude fall within the normal operating speed range of the mechanism and are consequently harmless.

The principles described above are of course readily applied in the design and construction of any type of power installation. It is only necessary that the effective masses and elasticities of the system be so distributed in the design and construction of the engine that pairs of cylinders be connected to the shafts at points which torsionally tend to vibrate with equal amplitude, either in the same direction or in opposite directions, as required by the particular problem in hand; and that the firing relation of the individual cylinders of a pair, shall be properly determined to cause neutralization of such vibrations which one desires to eliminate.

The turning effort of reciprocating combustion engines is quite irregular. The work performed by such or any engine is liable to be quite irregular. Either or each of these irregularities is liable to be of recurring character and to set up or stimulate to a critical degree torsional synchronous vibrations in the mass-elastic system comprising the shafts of the engine together with the flywheels and attached machinery. The counter-phase neutralization arrangement of the cylinders is designed for the elimination at the source of the character of vibration most liable to be harmfully synchronous while another torsional vibration which might tend to become harmfully synchronous may be neutralized by the location of the flywheel, or an inertia means $J_2$, at or near the nodal point in the system of such vibration, and the work performing connection, $J_1$, $J_{1a}$, is located at or near a substantial nodal point of the engine shaft or system in order that any irregularities in the work performed may be least liable to harmfully stimulate any, or any critical, torsional vibrations in the system.

The various illustrative applications described in my application of September 28, 1926, embody the principles of neutralization described in this specification.

The invention described herein may be manufactured and used by or for the Government of the United States of America for governmental purposes without the payment of any royalties thereon or therefor.

By the term "mode" as applied to a torsional vibration is meant the particular type of such vibration as characterized by the number of nodes in the shaft.

By the term "order" as applied to a torsional vibration is meant the number of such vibrations occurring in each engine revolution. All orders exist for each mode.

Having thus disclosed my invention, what I claim as new and desire to secure by Letters Patent, is:

1. In a power installation, including a reciprocating engine, a crank shaft having pairs of points thereon which tend to torsionally vibrate with equal amplitude pursuant to the power impulses to be imparted thereby by their hereinafter stated pistons, pairs of co-acting cylinders having pistons therein, the pistons of the respective cylinders of each pair, being connected to and at points on said crank shaft which tend to torsionally vibrate with equal amplitude pursuant to the power impulses imparted thereto by their respective pistons; and the respective pistons of each pair imparting their power impulses to the shaft at their said points of connection thereto and in such phase relation of the resulting torsional vibrations of said shaft that the second power impulse imparted to said shaft by each pair of pistons substantially neutralizes the torsional vibration in said shaft occasioned by the first imparted power impulse of each pair.

2. A power installation including a reciprocating engine, having a crank shaft provided with a symmetric distribution of its effective inertias and elasticities so as to give a symmetric normal-elastic curve over the crankshaft; including pairs of points on said shaft tending to torsionally vibrate with equal amplitude pursuant to the power impulses to be imparted thereto; pairs of co-acting equivalent power cylinders, the respective cylinders of each pair being symmetrically disposed relative to said points on and said curve over the crankshaft; and means whereby the respective cylinders of each pair impart their power impulses to the shaft in such phase relation of the resulting torsional vibrations of said shaft that the second power impulse imparted to said shaft by each pair of cylinders neutralizes itself by neutralizing the torsional vibration in said shaft occasioned by the first imparted power impulse of each such pair.

3. In a power installation having a natural period of mass-elastic vibration with one or more nodes, said power installation including a crank shaft, a group of individual impulse members connected to cranks thereof, said group producing a turning effort having one or more harmonic components, means for preventing undesired mass elastic torsional vibrations, said means consisting of a second group of individual impulse members connected to cranks of said shaft relative to said first group, with each unit of said second group forming a co-acting pair with a corresponding unit of the first group, one hundred eighty degrees of torsional vibration of said shaft due to said turning effort intervening between the cranks of each of said pairs, each of said pairs imparting their impulses severally to their respective cranks of said shaft in such torsional vibration phase relation to each other that the second impulse of each pair neutralizes itself by neutralizing the torsional vibration in said shaft occasioned by the first imparted impulse of each such pair, said cranks of each co-acting pair being vibratable equal amplitudes by said torsional vibration.

4. In a power installation having a natural period of mass-elastic vibration with one or more nodes, said power installation including a crank shaft, a group of individual impulse members connected to cranks thereof, said group producing a turning effort having one or more harmonic components, means for preventing undesired mass-elastic vibrations, said means consisting of a second group of individual impulse members connected and positioned relative to said shaft and said first group, with each unit of said second group forming a coacting pair with a corresponding unit of the first group, each of said pairs imparting their turning efforts in such counter-phasing time relation to each other and of such degree of torsional vibration in said shaft intermediate each pair of cranks due to said turning effort that the torsional vibrations in said shaft due to the turning effort of each pair of impulses will each substantially neutralize the other at their source.

5. In a power installation having a natural period of mass-elastic vibration with one or more nodes, said power installation including a crank shaft, a group of individual impulse members connected to cranks thereof, said group producing a turning effort having one or more harmonic components, means for preventing undesired mass-elastic torsional vibrations, said means consisting of a second group of similar individual impulse members positioned along said shaft and connected to cranks thereof so that each unit of said second group forms a coacting pair with a corresponding unit of said first group, the units of each of said pairs being symmetrically positioned with respect to a node of mass-elastic vibration of the cranks on said shaft to which said pairs are connected; and the time-phase relationship between the impulses of the units of coacting pairs and the elasticity of said shaft intermediate the cranks of each pair, each being so chosen as to make each pair of impulses one hundred and eighty degrees of torsional vibration of said shaft out of phase with each other at the cranks to which the impulses of each pair are imparted.

6. In means for eliminating substantial torsional vibrations tending to occur in a power installation the combination of a crank shaft, impulse means connected to a plurality of cranks each located on said shaft, the cranks on said shaft being in pairs with each crank of a pair being located at a point in said shaft where the substantial torsional vibrations tending to occur therein are of equal amplitude and vibrate the cranks of each pair out of the phase relative to each other and to one of the pair of power impulses at the time the same is imparted thereto by said impulse means, whereby one mode of torsional vibration in said shaft is neutralized substantially at its source.

7. In a means for eliminating substantial torsional vibrations tending to occur in a power installation the combination of a crank shaft having a plurality of cranks in pairs with each pair being located at points in said shaft where the substantial torsional vibration tending to occur therein is of equal amplitude, a corresponding series of power impulse means connected to said cranks, the elasticity of said shaft between each pair of cranks being such that there intervenes between each pair of cranks substantially one hundred eighty degrees of torsional vibration initiated by the appropriate one of each series of power impulse means, and means for timing the impulses adapted to be imparted by said means to said shaft at time intervals of substantially one hundred eighty degrees relative to the substantial torsional vibration tending to occur in said shaft.

8. In means for eliminating substantial torsional vibrations tending to occur in a power installation, the combination of a power transmission means, a plurality of power impulse means in pairs adapted to operate said power transmission means, means for operatively connecting each of the impulse means forming a pair to said first named means at points where the substantial torsional vibration tending to occur in said first means is of equal amplitude, the elasticity of said transmission means between the points of connection therewith of each pair of impulse means being such that there intervenes between each pair of said points substantially one hundred eighty degrees of torsional vibration initiated by the appropriate one of each pair of impulse means and means whereby each pair of said impulse means imparts its impulses in such time-phase relationship as to counter-phase the torsional vibration in said transmission means initiated by the first imparted impulse of each pair by such vibration of the second imparted impulse of each pair.

9. In a means for eliminating substantial torsional vibrations tending to occur in a rotary power transmission, the combination of power transmission means having at least one pair of points thereon tending to vibrate equal amplitudes by the torsional vibration occasioned by a hereinafter stated impulse, means connected to said at least one pair of points on said transmission means and adapted to afford impulses in at least one coacting pair, the elasticity of said transmission intermediate said points being such that substantially one hundred eighty degrees of torsional vibration intervene between said points, each impulse of said pair being offset a number of degrees of rotation of said transmission means and adapted, by said offsetting and the point of connecting each of said impulses with said transmission means, to be in such time phase relationship, relative to the order of torsional vibration liable to be harmful in said transmission means, that the torsional vibrations set up in the transmission by each of the pair of impulses are out of phase with and neutralize each other.

10. In a means for eliminating substantial torsional vibrations tending to occur in a rotary power transmission, the combination of power transmission means having at least one pair of points thereon tending to vibrate equal amplitudes by the torsional vibration occasioned by a hereinafter stated impulse, means connected to said at least one pair of points on said transmission means and adapted to afford impulses in at least one coacting pair, each impulse of said pair being offset thirty degrees of rotation of said transmission means relative to each other and adapted, by said offsetting and the point of connecting each of said impulses with said transmission means, to be in such time and torsional vibrational phase relationship that one impulse of the pair is afforded the transmission means and tends to produce a torsional vibration therein substantially one-hundred and eighty degrees out of phase with such vibration tending to be produced by the other impulse of said pair, whereby the harmonic component torques of the turning efforts of the coacting pair of impulses substantially neutralize each other.

11. In a means for neutralizing at least one order of torsional vibrations tending to occur in power transmissions, the combination of a crank shaft having at least one crank adapted to be vibrated with equal amplitudes in the same direction by torsional vibrations in said shaft, a coacting pair of cylinders having pistons each connected to said at least one crank, said pair of cylinders being offset relative to each other and said crank, and said offset being determinable according to the following formula: wherein $\theta$ equals the number of degrees of crank travel elapsing between the firing top dead centers of the cylinders of a coacting pair; M equals the order of torsional vibration desired to be neutralized; N equals any integer $$\theta = \frac{360°N}{M} + \frac{180°}{M}$$

12. In a means for neutralizing at least one order of torsional vibrations tending to occur in power transmissions, the combination of a crank shaft having at least a pair of cranks, and said shaft and cranks being of such material and dimensions that the pair of cranks are vibratable with equal amplitudes in opposite direction by torsional vibrations in said shaft, at least one coacting pair of cylinders each having pistons connected to their respective cranks, said pair of cylinders being offset relative to each other and said cranks, and said relative conditions being determinable according to the following formula:

$$\theta = \frac{360° \times N}{M}$$

where $\theta$ equals the number of degrees of crank travel elapsing between the firing top dead centers of the cylinders of a coacting pair; M equals the order of torsional vibration desired to be neutralized; N equals any integer.

13. In a means for neutralizing at least one order of torsional vibrations tending to occur in a crank shaft, the combination of at least one coacting pair of power cylinders whose bores are at an angle to each other; a piston in each cylinder; a crank shaft having at least one crank pin adapted to be vibrated by torsional vibrations in said shaft; means for connecting said pistons forming a pair to said crank, and said angle being determinable according to substantially the following formula, wherein $\theta$ equals the number of degrees of crank travel elapsing between the firing top dead centers of the coacting pair of cylinders; M equals the order of torsional vibration desired to be neutralized, and N equals any integer:

$$\theta = \frac{360°N}{M} + \frac{180°}{M}$$

14. In a means for neutralizing at least an order of torsional vibrations tending to occur in a crank shaft, the combination of a crank shaft having at least one crank pin, said shaft and pin being of such characteristics that said pin is vibratable with equal amplitudes in opposite directions by torsional vibrations of said shaft, a coacting pair of power cylinders each having a piston connected to said pin, said cylinders having their bores at an angle to each other, said angle being determinable according to the following formula $$\theta = \frac{360° \times N}{M}$$

wherein $\theta$ equals the number of degrees of crank travel elapsing between the firing top dead centers of said cylinders of the coacting pair; M equals the order of torsional vibration desired to be neutralized, and N equals any integer.

15. In a means for neutralizing at least one order of torsional vibrations tending to occur in a crank shaft, the combination of a crank shaft having at least one crank pin, said shaft and pin being of such characteristics that said pin is vibratable with equal amplitudes in either direction by torsional vibrations of said shaft, and a coacting pair of power cylinders each having a piston connected to said pin, said cylinders and pistons being in such relation to said pin that the power impulse of the second one of said pair may be imparted to said pin while it is torsionally vibrating at an uneven multiple of 180° of the torsional vibration initiated in said shaft by the power impulse imparted by the first one of said pair.

GEORGE JOSEPH DASHEFSKY.